Jan. 19, 1960   J. BARÁTOSSY ET AL   2,921,563
REGULATING DEVICE FOR SERVO-MOTORS
Filed April 8, 1957   6 Sheets-Sheet 1

Fig. 1

INVENTORS
JENŐ BARÁTOSSY
JENŐ SVINGOR
BY
Irwin S. Thompson
ATTORNEY

Jan. 19, 1960 J. BARÁTOSSY ET AL 2,921,563
REGULATING DEVICE FOR SERVO-MOTORS
Filed April 8, 1957 6 Sheets-Sheet 4

Fig.4
Fig.5
Fig.6
Fig.7

INVENTORS
JENO BARATOSSY
JENO SVINGOR
BY Irwin S. Thompson
ATTY.

Jan. 19, 1960  J. BARÁTOSSY ET AL  2,921,563
REGULATING DEVICE FOR SERVO-MOTORS
Filed April 8, 1957  6 Sheets-Sheet 5

INVENTORS
JENŐ BARÁTOSSY
JENŐ SVINGOR
BY
Irvin S. Thompson
ATTORNEY

Jan. 19, 1960     J. BARÁTOSSY ET AL     2,921,563
REGULATING DEVICE FOR SERVO-MOTORS
Filed April 8, 1957                       6 Sheets-Sheet 6

INVENTORS
JENŐ BARÁTOSSY
JENŐ SVINGOR

BY Irvin S. Thompson
ATTORNEY

United States Patent Office 2,921,563
Patented Jan. 19, 1960

2,921,563
REGULATING DEVICE FOR SERVO-MOTORS

Jenö Barátossy and Jenö Svingor, Budapest, Hungary, assignors to Szerszamgepfejleszto Intezet, Halasztelek, Hungary Application April 8, 1957, Serial No. 651,355

8 Claims. (Cl. 121—45)

The present invention relates to a regulating device for servo-motors and has for its main object to improve and develop the invention disclosed in our co-pending application Serial No. 598,551, filed July 18, 1956 now Patent 2,854,957 issued October 7, 1958. In this patent application a regulating device is described for servo-motors, in which a pulley is rolling on a rotating drum in such a way that one of these parts is moved axially by the servo-motor; thus a frictionless movement is only possible if the pulley is set in a certain inclined position, the inclination of which is determined by the resultant of the said axial speed and the circumferential speed of the drum. Now, if one of these two speeds or both are changed, the frictional force produced between the drum and the pulley causes an axial shifting of the drum or of the pulley and these movements are employed to regulate the power of the servo-motor in such a way that the original or the desired speed is restored.

In a very important application of this invention a cylindrical drum is used to control the pressure of the fluid of a hydraulic servo-motor, which automatically shifts in the desired way the slides of a machine-tool, say a lathe or a milling machine.

According to the present invention this regulating device is improved in such a way that it becomes equal to tasks which could not be solved economically up to now. Such a task is the automatic control of the whole cycle of action of the tools fastened to the slide system of a machine-tool. According to the invention an automatic machine-tool may be built suitable for the mass production of work pieces which are much more complicated and of much larger size than the pieces produced by the known machines of similar dimensions. Another advantage of the machine-tools according to the invention is, that they are inexpensive to build and, in addition, they can be very easily set to produce a certain work piece.

It is understood, however, that the present invention is not confined to the use on machine-tools, but it may be advantageously used for regulating servo-motors in general.

According to the invention the control arm of the servo-motor of the said type, adapted to adjust the plane of rotation of the pulley to the desired inclination, or in general the control organ of the servo-motor is influenced by a feeler moved along two guides not parallel with one another; along one of these guides the feeler is moved by the servo-motor and along the other guide it is moved by an intermittently moving positive actuating means, each period of movement of which is started when the said movement produced by the servo-motor arrives at a predetermined point.

Other details of the invention are set forth in the following specification referring to the enclosed drawings, showing diagrammatically some embodiments of the invention by way of example. The parts unimportant from the point of view of this invention are omitted from the drawing.

Finally.

Description of the most important parts of the first embodiment

The longitudinal slide 3 of the lathe of usual construction (Figs. 1 and 2) is moved by a double-diameter or differential hydraulic piston 1 and the cross slide 4 is driven by the hydraulic piston 2. The hydraulic fluid comes from a pump 7 and the pressure of this fluid is regulated by means of two slide-valves 5 and 6, the former one belonging to the longitudinal slide of the lathe and the latter to the cross slide 4. Two rotating drums 8 and 8a control the said slide-valves 5 and 6 respectively in the manner explained in detail in the said patent application Serial No. 598,551.

Figure 2:
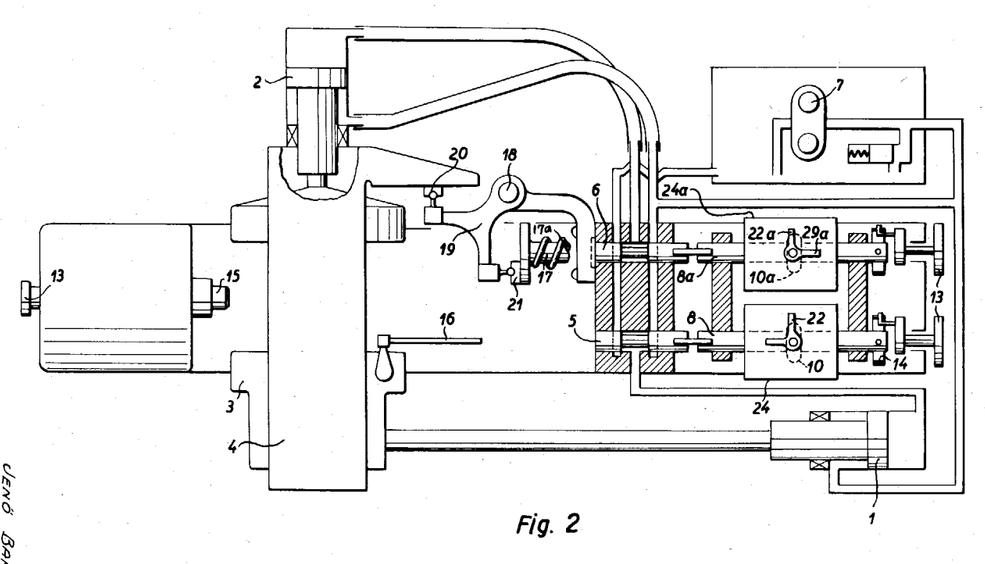
Fig. 2 is a plan view of the lathe of Fig. 1.

On each of the drums there rolls a pulley marked 10 and 10a respectively, these pulleys being adapted to be turned together with their bearings around a bolt 11 or 11a, for attaining the inclined position mentioned in the introduction. Fig. 2 shows both pulleys in a position perpendicular to the axis of rotation of the drums that is to say in the neutral position, in which the forces on the two sides of the hydraulic piston equalize each other and the piston does not move.

The two drums 8 and 8a are driven by the main shaft 15 of the lathe by means of an intermediate shaft 12, the gearing 13 and clutches 14, which are suitable to allow the necessary axial movement of the drums. As is explained in our said patent application, the pulleys should be moved axially along the drums, for which purpose rod 16 connects the longitudinal slide 3 with the bearing of pulley 10. The other pulley 10a should be moved in the same direction that is to say longitudinally, because in the form of the invention shown in the drawing the drums are parallel. For this purpose a rod 17 (partly shown in Fig. 2) is connected to the cross slide by means of a knee lever 19 pivoted at 18 and engaging the slide and the rod 17 by means of two slidable plates 20 and 21 respectively. Thus, the crosswise movements of the slide 4 are converted at pulley 10a into longitudinal movements. A spring 17a presses the rod 17 to the plate 21.

For moving the slides in the desired way the pressure of the hydraulic fluid is to be regulated, for which purpose the plane of rotation of pulleys 10 and 10a is to be changed as set forth in our above mentioned co-pending patent application. In the specification of this application it is explained that if the plane of rotation of the pulley is turned, the rotating drum is shifted axially and so the slide-valve 5 (or 6) too is slid for regulating the pressure of the hydraulic fluid in the desired way. Thus, for a suitable control of the servo-motor the bolt 11 is to be turned at the right moment and with the right angle. For this purpose a control arm 22 (at the other pulley 22a) is fastened at the top of bolts. These arms are actuated by control means provided in casings 24 and 24a, these control means being shown in Fig. 3. Each casing is moved together with the respective pulley and its bearing, in a straight guide shown in Fig. 3.

Figure 1:
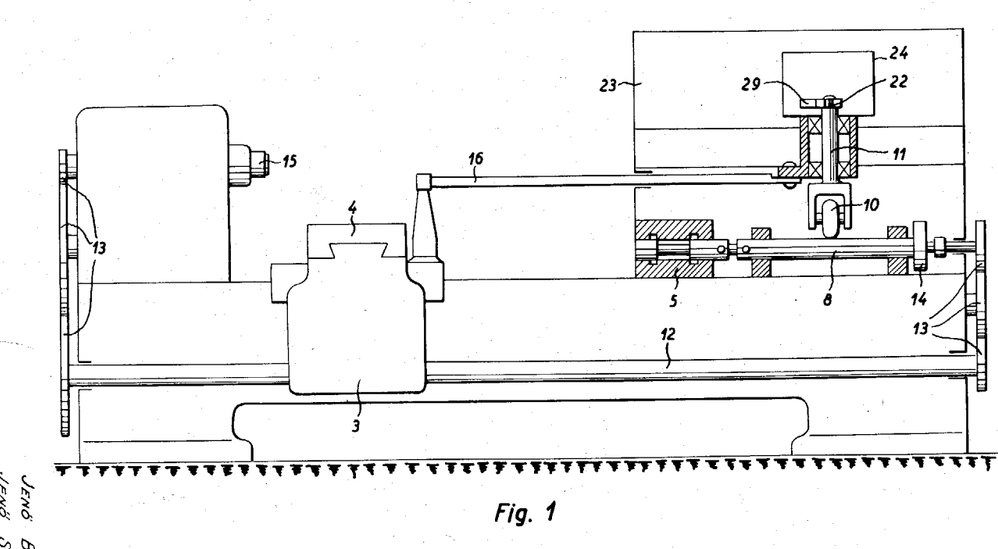
Fig. 1 is the side view of a lathe the longitudinal slide and the cross slide of which are moved by a hydraulic servo-motor of the type described in the introduction, this motor being provided with a control device according to the invention.
Figure 3:
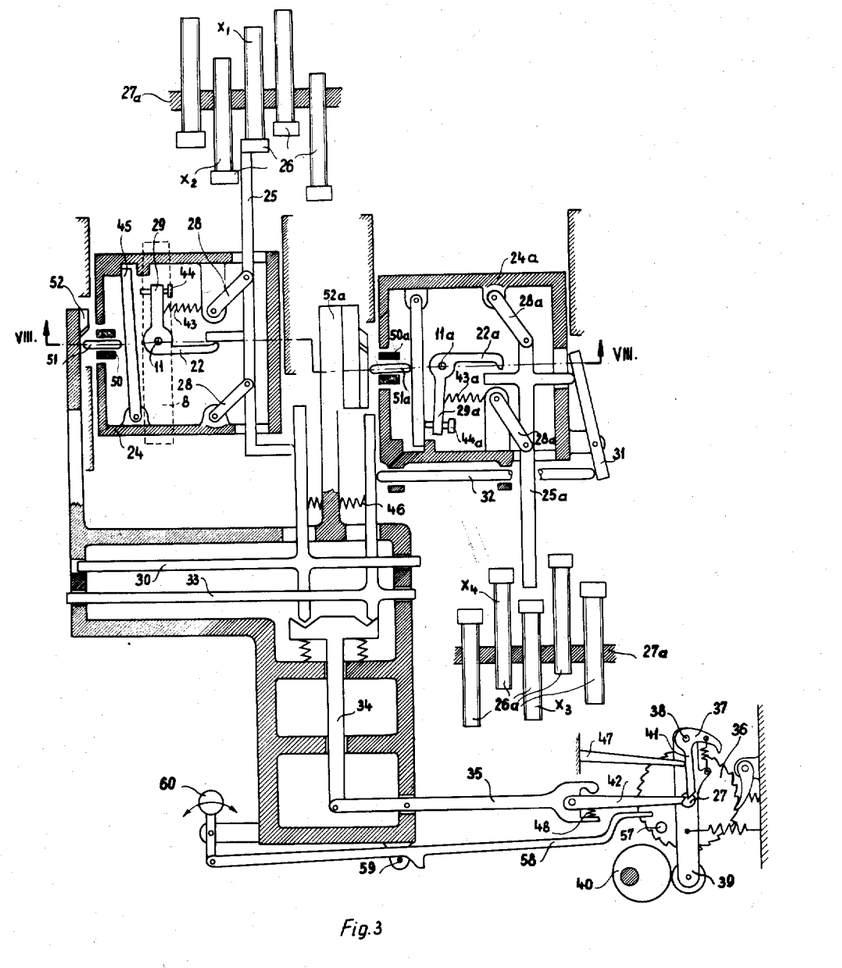
Fig. 3 is the diagrammatic plan view of the control device itself, the parts being shown in a plane for the sake of an easy understanding.

The two casings 24 and 24a and the actuating means outside them are arranged in an unmovable case 23 shown in Fig. 1 only. Thus, the two drums, two pulleys and the whole control device is contained in the said case 23. These control elements are not shown in Figs. 1 and 2; they will be described in connection with Figs. 3 and 4. In Fig. 3 the left hand device belongs to the longitudinal slide of the lathe and the right hand device to the cross slide; similar parts in these two devices are marked with identical numbers, but on the right side with the addition of the letter a.

Figures 4, 5:
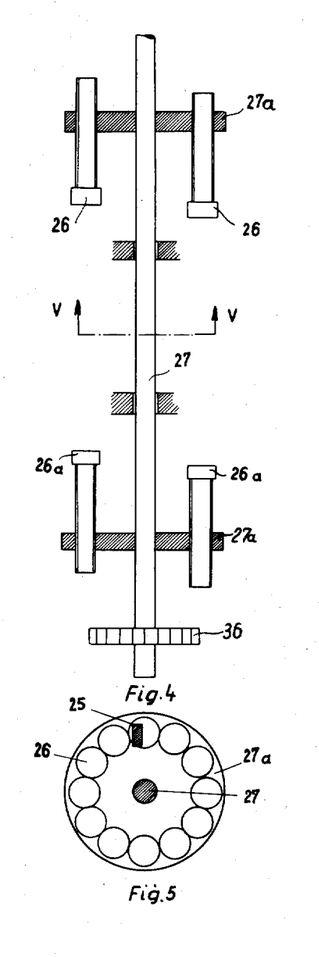
Fig. 4 shows a part of the device in plan view.
Fig. 5 is a section along line V—V of Fig. 4.

The rotatable control arm 22 is actuated by a feeler 25 engaging a positive actuating means composed of screw bolts 26 mounted along a concentric circle in 27a which is keyed to a shaft 27. In Fig. 4 this shaft is shown together with the two actuating means in a sectional view, and for the purpose of clearly showing the cooperation of the bolts 26 with the feeler 25, these bolts are illustrated near the feeler side by side.

The feeler 25 is mounted in the casing 24 by means of two pivot arms 28, so that it moves together with this casing, but may move in respect to this casing along an arcuate path. The control arm 22 forms with arm 29 a knee lever acted upon by a spring 43. The curved end of feeler 25 may push a rod 30 and the other feeler 25a cooperates with a rod 33 by the action of the parts 31, 32. The wedged ends of rods 30 and 33 cooperate with similarly shaped cavities in the head of rod 34 pivoted on a two-armed lever 35. The parts connected to this lever serve for the intermittent turning of shaft 27, that is to say of the positive actuating means, for which purpose a ratchet wheel 36 is keyed to the shaft 27. For the sake of a simple illustrating the ratchet wheel 36 and the parts belonging to it are not shown in Fig. 3 in plan view as the other parts, but in a diagrammatic side view.

The periodic turning of shaft 27 is done by means of a pawl 37 co-operating with the said ratchet wheel 36 fixed on shaft 27. The pawl 37 has a vertical elongated arm 41 and is pivoted at 38 on a two-armed lever 39, which may turn freely on shaft 27. On the end of this lever there is a roller engaging a cam 40.

The said arm 41 may engage a horizontal arm 42 pivotally connected to the two-armed lever 35.

*Function of the embodiment described in the foregoing*

Fig. 3 shows the situation in which the casing 24 and together with it the longitudinal slide does not move, because the control arm 22 is in the middle or neutral position, but the casing 24a is gliding forward, because the arm 22a is in an inclined position and so the cross slide of the lathe is also moving forward. It is understood that for an easy showing of the device the drums 8 and 8a are in Fig. 2 in a horizontal, and in Fig. 3 in an upright position, so that a movement directed in Fig. 2 from the left to the right corresponds in Fig. 3 to a forward movement and vice versa.

The said situation according to Fig. 3 may correspond to a period of the whole cycle of machining in which a tool situated behind the work piece produces a groove in it by a so-called recessing operation. Let us assume that this operation is the first period of the whole cycle of operations.

The control arm 22 is in its middle position because the spring 43 pressing arm 29 to the left presses control arm 22 to an extension of the feeler 25 and this latter is also in its middle position. As mentioned already, the feeler may move along a curved path and remains during this movement parallel with itself. The spring 43 is not able to shift away the feeler from this middle position as the end of it engages one of the bolts 26; this bolt is marked by the letter $x_1$. The rest position of casing 24 is assured in the following way: if this casing moves for a little extent for example backwards (corresponding to a movement to the left according to Fig. 2), the feeler 25 engaging the unmovable bolt $26x_1$ (Figs. 3 and 5) is moved compared to the casing forward, which causes a turning of the arm 22. Thus the plane of rotation of pulley 10 is altered and the casing 24 is brought back to its neutral position together with the longitudinal slide of the lathe. In a shifting of the casing 24 in the contrary direction, analogous operations will be produced, so that by setting the bolt 26 in a certain position the position of rest of the casing end of the parts belonging to it is definitely determined.

The control arm 22a of casing 24a cannot be held in its middle position by its feeler 25a against the action of its spring 43a, because in the position shown in the drawing the front end of the feeler doesn ot engage the bolt marked by $x_3$. The knee lever 22a, 29a is in an inclined position, in which a set screw 44a of this lever engages an arm 45a. Thus, the inclination of the lever and of the pulley 10a is determined by the said screw 44a.

In consequence of the inclined position of knee lever 22a, 29a the casing 24a and the cross slide 4 of the lathe (Fig. 2) are shifted forward, until the free end of the feeler strikes the bolt $x_3$. Now the feeler starts a backward movement compared to the casing 24a and the pulley 10a is successively brought in its middle position, so that this casing and the cross slide is stopped.

From the foregoing it is clear that by the adjusting of the corresponding bolt 26a (which is marked by the letter $x_3$) the place of stopping of the casing 24a and of the cross slide may be determined at will, which means that the slide is stopped at a predetermined point of the movement caused by the servo-motor.

The feeler 25a is coupled to the casing by means of inclined pivot arm 28a (similar to feeler 25) so that this feeler is moved before it stops not only backwards but also to the right. This latter movement causes the longer arm of lever 31 to swing to the right, so that the other arm of this lever pushes rods 32 and 33 to the left against a spring 46. In such a way the wedged shaped end of an extension of rod 33 comes to the centre of a cavity in the T-shaped head of rod 34 and as the wedge-shaped extension of rod 30 is already above the centre of the cavity belonging to it, the rod 34 is raised by its springs. The latter extension is in the said position, because control arm 22 and feeler 25 are in their neutral or middle position. The raising movement of the rod 34 is always possible, if the wedge-shaped extensions are exactly in their middle position or if they approach this position by a short, predetermined distance.

During the said operations, that is to say during the movement of the cross slide, the lever 39 is continuously swung to and fro by the cam 40. This swinging movement is, however, without any consequence, as the pawl 37 passes above the ratchet wheel 36, because the vertical arm 41 of this pawl engages in the left hand extreme position a stationary extension 47 and in a position swung to the right it touches the arm 42. Thus, the pawl cannot be turned by its spring towards the ratchet wheel 36. If, however, both slides of the lathe are unmovable because the arms 22 are in their neutral position and the rod 34 is raised as described already, lever 35 is swung in such a way that the arm 42 disengages arm 41 and the pawl is turned in clockwise direction if the upper arm of lever 39 is swung to the right. Thus the ratchet wheel and the shaft 27 are turned by one tooth.

Before the end of this turning movement of shaft 27 pulley 10 is swung away from its middle position by means of one of the bolts 26 as explained later, so that as the movement of the parts belonging to this pulley is started, rod 34 is lowered and arm 42 is raised. Thus, this arm 42 strikes from below the end of arm 41. In spite of that the said swinging movement of lever 39 may be terminated without hindrance, as the arm 42 is swung away against the action of spring 48.

At the next swinging back of the lever 39 the arm 41 strikes the fixed buffer 47 and thus the pawl is turned counterclockwise against the action of its spring compared to the lever 39, and when the arm 41 leaves arm 42, the parts take the position shown in Fig. 3.

Figure 6:
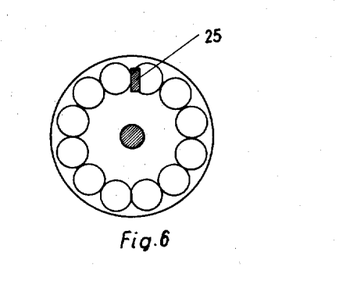
Figs. 6 and 7 are views similar to Fig. 5 but in other positions of the component parts.

Now it is already clear that after the end of the first period of the cycle, that is to say when the slides of the lathe have been already stopped, the shaft 27 and the discs 27a together with bolts 26 are turned by a certain angle so that the position shown in Fig. 6 is produced and the next or second period is immediately started. There the bolts 62 are shown side by side, this turning movement corresponding to a shifting to the right.

The turning of the shaft 27 by one tooth is preferably equal to half of the distance between two neighbouring bolts (that is to say half of the pitch) and this turning movement is of no effect at the beginning of the second period for the casing 24a. Namely, when the bolt $x_3$ caused the feeler 25a to move backwards, this feeler moved at the same time along an arcuate path to the right compared to the position shown in the drawing. Thus, at the beginning of the turning of shaft 27 the feeler engages the right side of bolt $x_3$ and during the said turning this bolt slides under the unmovable feeler, so that after a turning with an angle equal to half of the pitch, the feeler touches the left part of the bolt head. However, no other operation is done at this part of the device and thus the casing 24a which was stopped at the end of the first period remains unmovable.

The bolts 26 are fastened in their disc 27a in a position turned in respect to bolts 26a with half the pitch so that in the position of rest of casing 24 shown in Fig. 3 the feeler 25 engages the left part of the corresponding bolt 26 marked $x_1$. Thus, when the bolts move to the right, the following bolt $x_2$ strikes onto the feeler and pushes it to the right along the curved path determined by the pivot arm 28. The feeler moving in such a way forward turns the control arm 22, so that casing 24 begins to slide according to Fig. 3 forward and the longitudinal slide is moved in the same direction, that is to say according to Fig. 2 to the right.

As the feeler has been moved by the bolt $x_2$ to the right, its extention pushes the rod 30 in a horizontal guide to the right against the action of a spring 49. Thus the wedge-shaped end of this rod is moved out of the cavity in the head of the rod 34, so that this rod is lowered causing the raising of rod 42, with the consequence that the pawl 37 passes again without any effect above the ratchet wheel 36, as was explained above.

Figure 7:
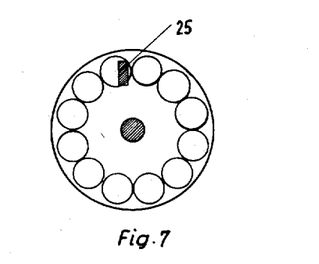

When bolt 26 has pushed to the right the feeler and stopped, this feeler begins to move forward together with casing 24 and during this movement the feeler passes along the side surface of the bolt. When the end of the feeler arrives at the edge of the bolt, spring 49 presses it to the left and its end passes along the top surface of the bolt head, so that the position shown in Fig. 7 is attained. During this movement the control arm 22 is also slowly turned and when it reaches its neutral position the casing 24 stops, causing the longitudinal slide of the lathe to cease its gliding movement.

In the foregoing one movement of the longitudinal slide and one movement of the cross slide was described, forming two periods of the whole cycle. The stopping of the parts was always produced by the control arms of the servo-motor reaching their neutral position at the end of the period.

In this embodiment of the invention during the second period the longitudinal slide was moving and the cross slide was unmovable. At the end of this second period the longitudinal slide stops too, the rod 34 is again raised and the shaft 27 is again turned with an angle corresponding to one tooth. This rotation has no effect on the feeler 25, because its end only glides along the top surface of the bolt $x_2$ and so it passes from the right side of this bolt to the left side. In respect to the casing or the machine frame, however, the feeler does not move.

The next bolt 26a however, that is to say bolt $x_4$ strikes at this turning movement feeler 25a and pushes it to the right, so that it is shifted along its curved path, and at the same time backwards. This is done because the end of this feeler engages before this turning of the shaft 27 the left part of bolt $x_3$. By the said backward movement of the feeler the control arm 22a is turned and the cross slide starts its glide backwards. During this operation the feeler is held in its swung position by the bolt head $x_4$ until its end reaches the edge of the bolt head. Now the feeler and the arm 22a begin to move under the action of spring 46 in the reverse direction and these parts come slowly in their neutral position, so that the third period is ended. Thus, the ratchet wheel 36 is again, for the third time, turned and the fourth period begins. Thus the moment of turning of the ratchet wheel or of the positive actuating means is determined by the setting of the bolts forming this actuating means because this actuating means turns and a new period begins when the parts have been brought by the servo-motor to a predetermined point of their movement.

The fourth period is not started in the same way as the second and third one; these latter periods are begun when one of the bolts pushes the feeler to the right in consequence of the turning of shaft 27, but at the beginning of the fourth period the feeler 25 engaging the left part of bolt $x_2$ becomes free in consequence of the turning of shaft 27 so that the spring 49 may freely exert its action and it pushes the feeler backwards along its curved path. Thus the control arm 22 turns also backwards by the action of spring 43. This movement of the control arm is in a reverse direction as compared to the turning in the second period and consequently the longitudinal slide of the lathe is moved to the left (Fig. 2). The fourth period is now similar to the first one, the starting of which is also similar to the beginning of the fourth period, but the beginning of the first period was not described above.

It is now understood that the bolts 26 or other adjustable parts forming the positive actuating means possess two effective surfaces: the side surface pushing the bolts at the turning of the shaft 27 and the top surface which is perpendicular or at least crosswise to the side surface and is adapted to guide the feeler at the limits of the periods. However, it is not necessary that these two surfaces shall be clearly distinguished from one another as shown in the drawing, as they may be connected by arcuate intermediate surfaces.

The other periods are similar to the ones described in the foregoings and after a full revolution of the shaft 27 a new cycle is begun.

In most cases the longitudinal and the crosswise movements follow each other successively. However, it may be necessary to produce after a longitudinal movement another such movement in the reverse direction and the same holds true for the cross slide of a machine-tool. If the crosswise movements should follow each other, two neighbouring bolts 26 are adjusted for same height, so that after turning of the shaft 27 the feeler 25 passes from one bolt head to the other without turning away the control arm 22 from its neutral position and without hindering the raising of the rod 34. In an analogous way two longitudinal movements can be caused to follow each other.

If the work piece to be produced is so simple that not all the bolts of the positive actuating means are necessary, the superfluous bolts are also adjusted to the same height, so that the feelers remain in their neutral position during their pass over these bolts, the rod 34 remains in its upper position and the pawl 37 turns shaft 27. When one of the feelers comes to a bolt adjusted to another height, this feeler is shifted away or it is allowed to move away from its neutral position, so that a new period starts, one of the slides of the machine-tool begins to move and shaft 27 remains unmovable.

In the foregoing no detailed explanation was given of the regulating of the speed of the slides 3 and 4, there only having been discussed the angle by which the control arm is turned and thus the speed produced by the servo-motor may be changed by adjusting the screw 44 or 44a. This latter screw engages an arm 45a (see Figs. 3 and 8) which is not swung to the left around its pivot by the action of the spring 43a, because it is held by a short rod 51a guided in a sleeve 50a and bearing on a bar 52a. On the end of this bar there is an adjustable, inclined projection.

By this device the speed may be changed during one period, which in the embodiment shown has the purpose of moving the tool in high speed towards the work piece and then to slow it down to the speed of the desired feed. For this purpose the device functions as follows:

When the casing 24a is started to move forward, the arm 45a is in its left hand extreme position, because the short rod 51a does not touch the said projection of bar 52a. Thus, the spring 43a is able to fully exert its action and the control arm 22a is also in its extreme position so that the speed produced by the servo-motor is the greatest. However, when the casing and the slide belonging thereto has travelled for a certain distance, the rod 51a engages the projection of bar 52a, arm 45a is turned to the right, control arm 22a and the pulley belonging to it are also turned in such a way that the speed is slowed down to a value determined by the set screw 44a. Thus, the slide travels further with the speed of the desired feed.

Quite analogous operations may be accomplished in connection with the casing 24, but as the change in the speed should be effected in the reverse direction, the inclination of the projection of bar 52 is also reverse.

The work piece is, of course, machined by means of several tools and in most cases the speeds necessary for the individual tools are different. Thus, not only one bar 52 is used but several such bars are employed marked 52', 52'', etc. At the same time the sleeve 50 is movable in the vertical direction by means of a knee lever 53, against the action of a spring. The other sleeve 50a is controlled by lever 54 and these two levers are moved by rolls 56 cooperating with pins in a disc 55 keyed to the shaft 27. The said pins can be screwed in or out, that is to say, they can be adjusted. Thus, during the turning movement of shaft 27 always the predetermined one of bars 52 is put into operative position in front of the short rod 51 and as the inclined parts 52 of the bars are adjusted in the desired way, the speed of the casings and of the slides is in each period also equal with the desired value. Finally, if the sleeve 50 is in its uppermost position (left part of Fig. 8), the rod 51 has no effect at all and the slide moves along its whole path in high speed.

By the use of a starting handle 60 (left side of Fig. 3) the machine may be set in motion or it may be stopped or it can be attained that after a whole cycle that is to say after fully machining a work piece, the machine runs further or it is automatically stopped. For this purpose a rod 50 is connected to this handle 60 and the curved end of the rod cooperates with a pin 57 fastened to the ratchet wheel 36. In the center position of the handle shown in the drawing the machine runs continually, that is to say when a work piece is fully machined a new cycle is immediately begun, because pin 57 engages neither the arm 42 nor the rod 58 guided in the machine frame. If, however, this rod is shifted to the right from its centre position by means of the handle 60, its right end comes into the path of pin 57, so that after finishing a cycle this rod is raised by the pin and the lever 35 is supported from below. In such a way the right arm of this lever is unable to swing down, the pawl 37 cannot come into its working position and the shaft 27 is not turned. Consequently if the handle 60 is turned to the left, the cycle is ended, but when the work piece is fully machined, the parts moved by the servo-motor stop.

If the handle 60 is turned from its centre position during the function of the machine at any time to the right, only the period is ended, but at the end of this period the shaft 27 is not turned further and no new period is started. Namely, in this case the rod 58 is pulled to the left and thus its inclined projection glides along a pin 59 raising the rod, so that the right arm of the lever 35 is again prevented from lowering. Starting of the machine is accomplished by swinging back the handle 60 to the left.

*Description of some embodiments of the invention*

Figures 8, 9, 10, 12:
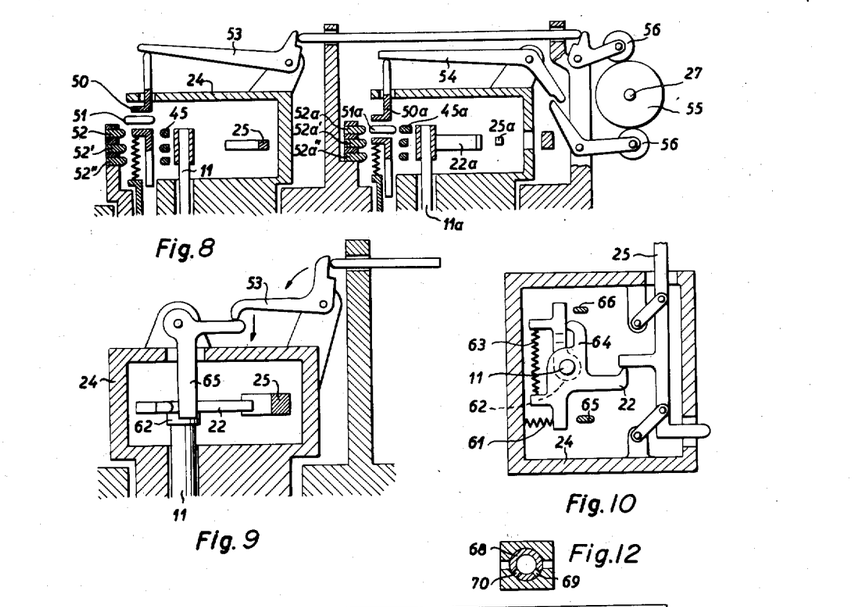
Fig. 8 is a vertical section of a part of the control device, approximately along the line VIII—VIII of Fig. 3.
Fig. 9 is a sectional view similar to that of Fig. 8 showing a modified form of the invention and Fig. 10 is a plan view of Fig. 9.
Fig. 12 is a section along line XII—XII of Fig. 11.

In the embodiment of the invention shown in Fig. 8 and described above a separate part, the bar 52, is brought into its working position by the turning of shaft 27, for attaining the desired speed of the feed. However, in the modified form shown in Figs. 9 and 10 there is no such part 52, but the lever 53 moved by the shaft 27 acts upon the shaft 11 by means of other transmitting means. For this purpose the arm 22 is not keyed on shaft 11 but may turn freely on it and is pressed by a spring 61 to a projection of the feeler 25. Under the arm 22 there is hub 62 keyed to the shaft 11 and a compression spring 63 is situated between a projection of this hub and a nose integral with the arm 22. On the arm 22 there is a further projection 64 engaging the hub 62.

On the lever 53 there are two arms 65 and 66 in a substantially vertical position, the arm 65 cooperating with the control arm 22 and the arm 66 cooperating with a projection of the hub 62.

By this device it can be attained that in both directions of movement the turning of shaft 11 is not a maximum but a predetermined slower turning movement is produced and thus the speed of the parts driven by the servo-motor is also slow. The speed is adjusted by the movement of lever 53, which is done in the following way:

One direction of the gliding movement of casing 24 is caused by the positive actuating means pushing the feeler 25 to the right, as it has been explained already. In this case the feeler moves not only to the right from its neutral position, but also forward, so that in the device shown in Figs. 9 and 10 the arm 22 is turned against the action of spring 61. This turning movement is transmitted by means of the spring 63 onto the hub 62 and thus the shaft 11 too is turned. However, the rotating movement of this shaft is immediately stopped when the projection of this hub engages the arm 66 and the further shifting of the feeler 25 causes only a stronger compressing of the spring 63. Thus, the turning of shaft 11 is limited by the said arm 66, the position of which is determined by the swinging movement of lever 53, that is to say, by the pins of the disc 55 shown in Fig. 8.

The other direction of the gliding of casing 24 is produced, as set forth above, when the positive actuating means allows the feeler to move backwards under the action of a spring. If this is done, the arm 22 follows the feeler under action of its spring 61 and this turning movement is transmitted by means of the projection 64 onto the hub 62, that is to say, onto the shaft 11. However, this turning movement is limited by the arm 65, as this arm hinders the further movement of the arm 22 and thus when the projection of arm 22 reaches arm 65, the further movements of the feeler are without any effect. The arm 65 is of course adjusted by the lever 53 in this case also.

Figure 11:
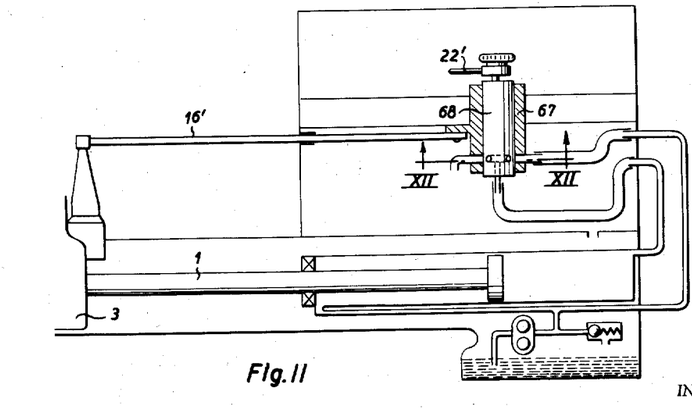
Fig. 11 shows a further embodiment of the invention provided with a hydraulic servo-motor of another type.

In Fig. 11 the invention is shown in connection with a hydraulic servo-motor of another type, to illustrate that the invention is not limited to the servo-motor according to the Patent No. 2,854,957. The servo-motor diagrammatically shown in Fig. 11 is applied on the same lathe as the servo-motor shown in Figs. 1 to 8, for making possible an easy comparison of the two constructions.

The piston 1' of the servo-motor drives the slide 3 of the lathe. This slide is connected by means of a rod 16' to the casing 67 of a three-way cock 68. The centre bore of this cock is connected to the space near the larger face of piston 1', the bore 69 is coupled to the pressure line of the pump and from bore 70 the oil may flow back to the oil sump.

The cock is connected to the fixed pipes by means of flexible hoses, as this cock moves with the slide 3.

On the upper part of the cock 68 there is an arm 22' by means of which the cock may be swung away from its centre position shown in the drawing. The control arm 22' and the parts connected to it are similar to the device shown in Figs. 3 or 10, so that the feeler (not illustrated in Fig. 11) turns this control arm one direction or in the other and thus the bore 69, or the other bore 70 is connected to the pipes belonging to it and this connection is done by a cross sectional area depending upon the angle by which the arm 22' has been turned. In consequence of this the piston 1' is moved with a certain speed in one direction or in the other and this speed depends upon the said cross sectional area.

It is not necessary to describe in detail the function of this servo-motor, as it is well known in itself and from the foregoing it is also clear that the combination of this known servo-motor with the device according to the invention has the effect explained in connection with Figs. 1 to 10, especially in connection with Fig. 3. However, the function of the device illustrated in Fig. 11, is not as exact as the function of the embodiment shown in Fig. 3, as the same turning movement of arm 22 that is to say, the same cross sectional area for the hydraulic fluid may result in different speeds within certain limits.

Figures 13, 15, 17:
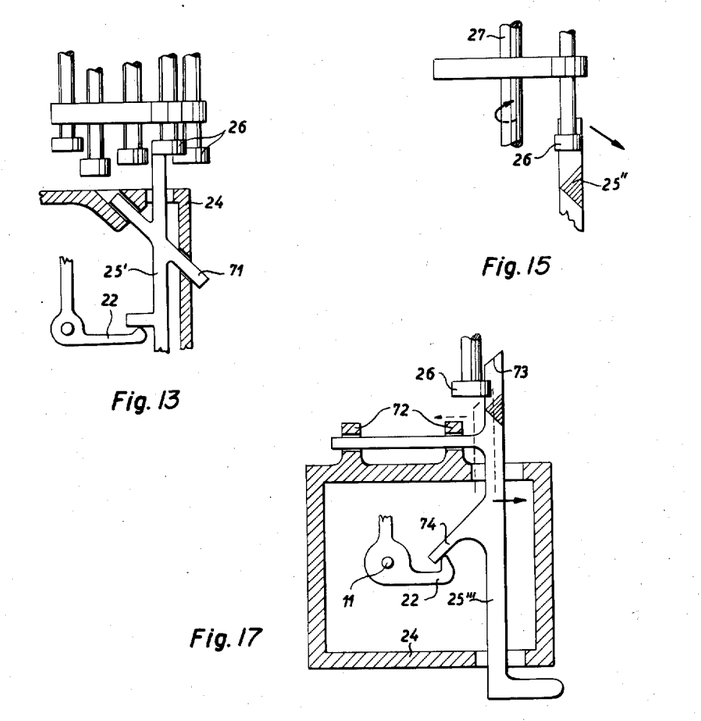
Figs. 13 and 14 are two views, partly in section, of a still further form of the invention
Figs. 15 and 16 show another modified form of the invention.
Fig. 17 is the diagrammatic view of further embodiment.
Figure 14:
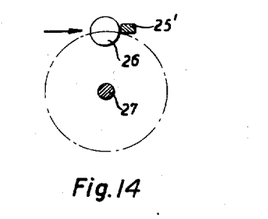

The constructional form of the invention shown in Fig. 13 differs from the embodiments already described only in that the feeler 25' does not move along a curved path compared to the casing 24, but it is moved in an inclined, straight guide of this casing. For this purpose the feeler is provided with two lateral arms 71 gliding in the said guide. Otherwise the function of this device is identical with the function of the embodiment according to Fig. 3 or Figs. 9 and 10, but the mode of illustrating is different, as the bolts 26 are shown in plan views, that is to say, they are not put in a plane. If one of these bolts pushed the feeler as it is best shown in Fig. 14, this feeler moves along its straight path in the longitudinal direction of the arms 71, and, in addition it is moved together with the casing 24. These two movements are not parallel, but they cross each other, with the result described above.

It is of course not necessary to make the positive actuating means moving the feeler of screw bolts, but this actuating means may be made of other adjustable elements striking onto the feeler mean, that is to say, acting as stops. However, if screw bolts are used, these bolts may act upon the feeler in different ways. In the foregoing embodiments the bolt which pushes the feeler moves in the same direction as the feeler itself as best shown in Fig. 14, but according to Figs. 15 and 16 the feeler 25'' is pushed by a bolt moving perpendicularly to the plane of movements of the feeler. The cross section of this feeler 25'' has a triangular shape and the bolt 26 acts upon one of the inclined surfaces, so that the feeler is moved in the direction of the arrow. In other respects the function is identical with the function of the other forms of the invention.

According to Fig. 17 the cross section of the feeler 25''' has also a triangular cross section, but this feeler does not move along an inclined path as compared to the casing 24, but it is moved in guide 72 perpendicularly to the gliding movement of the casing and to the axis of shaft 27. The free end of the feeler is beveled at 73, preferably with an angle of 45°. The feeler 25''' is further provided with a projection 74 protruding to the left and turning the control arm 22, if this feeler is shifted to the right.

Figure 16:
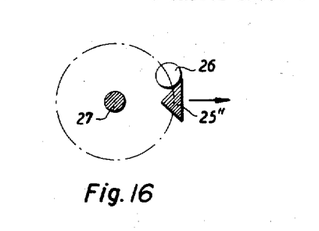

The function of this device is as follows:

If the shaft 27 not shown in Fig. 17 is turned, the bolt 26 engaging the inclined surface of the feeler shifts this feeler in the direction of the arrow shown in full lines, as in the device according to Figs. 15 and 16. Thus the feeler is moved in the straight guide 72 and the projection 74 turns arm 22, so that the casing 24 starts its movement. The feeler is moved together with the casing 24 in the direction of the arrow shown in double lines and when the inclined surface 73 reaches the edge of the bolt, the feeler is pushed to the left by its spring (see the arrow shown in dotted lines). During this movement the inclined surface 73 glides along the edge of the bolt and comes into the position shown in dotted lines. This movement of the feeler directed to the left is not a quick one, but it is a gradual shifting just as in the embodiments described in the foregoings, but in this case the slow shifting of the feeler is caused by inclination of the surface 73. When during this movement to the left the feeler and the arm 22 reach their neutral position, the casing 24 and the parts connected to it are stopped.

It is understood that in every embodiment of the present invention the resultant movement of the feeler is composed of two component movements, that is to say, this feeler is moved along two guides. One of these guides is identical with the guide of the casing 24, and the other guide is formed according to Figs. 3 and 10 by the pivoted rods 28 leading the feeler along a curved path and according to Figs. 13 and 17 this guide is composed of straight sleeves secured to the casing. Thus the expression "guide" means in this specification and in the claims any part suitable to force the feeler to move along a predetermined path, which may be straight, or may have the shape of a curve in a plane or in space. The two component movements of the feeler may be perpendicular or inclined to each other, but they cannot be parallel.

It is also understood that the invention can be used with one feeler only, but if two or more feelers are used in a unit for regulating the movement of two or more parts of the unit, the driving elements are advantageously wholly or partly common for all of the positive actuating mean of this machine. In the embodiments described in this specification this is attained by arranging the two positive actuating means on one and the same shaft 27 and by providing a common device intermittently turning this shaft for the two feelers.

We claim:

1. In a regulating device for servomotors having a control element, a feeler actuating said control element, two guides for the feeler inclined to each other, means actuated by the said servomotor and adapted to move the said feeler along one of said guides, and periodically moving positive actuating means adapted to move the feeler along the other of the said guides, the individual periods of movement of this actuating means being started when the movement caused by the servomotor reaches a predetermined point.

2. In a regulating device for servomotors, a rotating drum, a pulley rolling on this drum, means actuated by the servomotor and adapted to shift the pulley or the drum crosswise to the plane of rotation of the pulley which is adapted to be adjusted into an inclined position corresponding to the resultant of the said shifting and of the circumferential speed of the drum and permitting the pulley to roll on the drum without gliding, means actuated by the friction generated if the said inclination of the pulley is altered and adapted to change the speed produced by the servomotor, a control element of the servomotor adapted to change the said inclination of the plane of rotation of the pulley, a feeler actuating said control element, two guides for the said feeler inclined to each other, means actuated by the said servomotor and adapted to move the said feeler along one of said guides, and periodically moving positive actuating means adapted to move the feeler along the other of the said guides, the individual periods of movement of said actuating means being started when the movement caused by the servomotor reaches a predetermined point.

3. Regulating device according to claim 2 in which the periodically moving positive actuating means is formed of adjustable stops which have two active surfaces situated crosswise to each other, one of these surfaces being adapted to produce one of the said two movements of the feeler and along the other the feeler moves at the ends of the periods of dwell of the positive actuating means.

4. Regulating device according to claim 1 in which the periodically moving positive actuating means is formed of adjustable stops which have two active surfaces situated crosswise to each other, one of these surfaces being adapted to produce one of the said two movements of the feeler and along the other the feeler moves at the ends of the periods of dwell of the positive actuating means.

5. Regulating device according to claim 1 in which the feeler and the control element acted upon by it are connected by elastic means.

6. Regulating device according to claim 1 in which the control element, the feeler and the other actuating means connected therewith move with the servo-motor, so that this is one of the said two component movements of the feeler, and the feeler can be moved in respect of the casing or frame of the said actuating means and this is the second of the two component movements of the feeler.

7. A machine unit containing at least two regulating devices, each of which is identical as a whole with the device claimed in claim 2, these devices being connected to each other in such a way that the elements of the driving mechanism of the positive actuating means are, at least partially common for these actuating means.

8. A machine unit as claimed in claim 7 in which the feelers have a neutral position and in which the periodic movement of the positive actuating means, or a part of it is produced when all of the feelers are exactly or approximately in their neutral position.

References Cited in the file of this patent

UNITED STATES PATENTS

| | | |
|---|---|---|
| 1,244,664 | Warren | Oct. 30, 1917 |
| 2,278,396 | Saur | Mar. 31, 1942 |
| 2,543,759 | Cannon | Mar. 6, 1951 |